United States Patent
MacDonald

[15] 3,661,486
[45] May 9, 1972

[54] SHEET FORMING APPARATUS

[72] Inventor: Rodney A. MacDonald, Torrance, Calif.
[73] Assignee: Merco Products, Inc., Eugene, Oreg.
[22] Filed: May 7, 1970
[21] Appl. No.: 35,530

[52] U.S. Cl............................425/174, 156/475, 425/388, 425/397
[51] Int. Cl.........................................B29c 17/04
[58] Field of Search.................18/19 D, 19 F, 19 R, 5 R, 35, 18/DIG. 48, DIG. 60; 52/223, 225

[56] References Cited

UNITED STATES PATENTS

| | | | |
|---|---|---|---|
| 2,690,593 | 10/1954 | Abercrombie | 18/19 D X |
| 3,072,964 | 1/1963 | Tilden | 18/19 F |
| 3,121,920 | 2/1964 | Doyle et al. | 18/19 F X |
| 2,968,064 | 1/1961 | Howell | 18/DIG. 60 |
| 2,991,600 | 7/1961 | Lancaster | 18/DIG. 60 |
| 2,377,946 | 6/1945 | Leary | 18/19 F X |
| 2,836,852 | 6/1958 | Butzko | 18/19 F |
| 455,687 | 7/1891 | McCarthy | 52/225 |
| 2,675,695 | 4/1954 | Coff | 52/225 |

FOREIGN PATENTS OR APPLICATIONS 7,727   0/1899   Norway ................................52/225

Primary Examiner—Robert L. Spicer, Jr.
Attorney—Kolisch & Hartwell

[57] ABSTRACT

Apparatus for forming sheet material including a mold table, for supporting a mold with a sheet of airproof moldable material draped loosely thereover, and a clamping frame fro clamping the edges of the sheet against the table. The clamping frame includes a hollow side beam with an internally mounted adjustable truss for stiffening the beam to inhibit deflection. A vacuum manifold extends along the side of the beam adjacent the table with suction cups spaced therealong. A lower-than-atmospheric pressure may be produced in the manifold. The suction cups communicate with the manifold and act as vacuum grab means to hold the edges of a sheet against the beam when the pressure in the manifold is lowered. The clamping frame is movable toward and away from the table, and selective use of the vacuum grab permits the sheet either to remain on the table, or to be carried away from the table with the frame. A heat source is spaced from the frame in a direction opposite the table. The heat source is operable to heat a thermoplastic sheet carried with the frame to make it pliable and thus easier to form over the mold.

9 Claims, 4 Drawing Figures

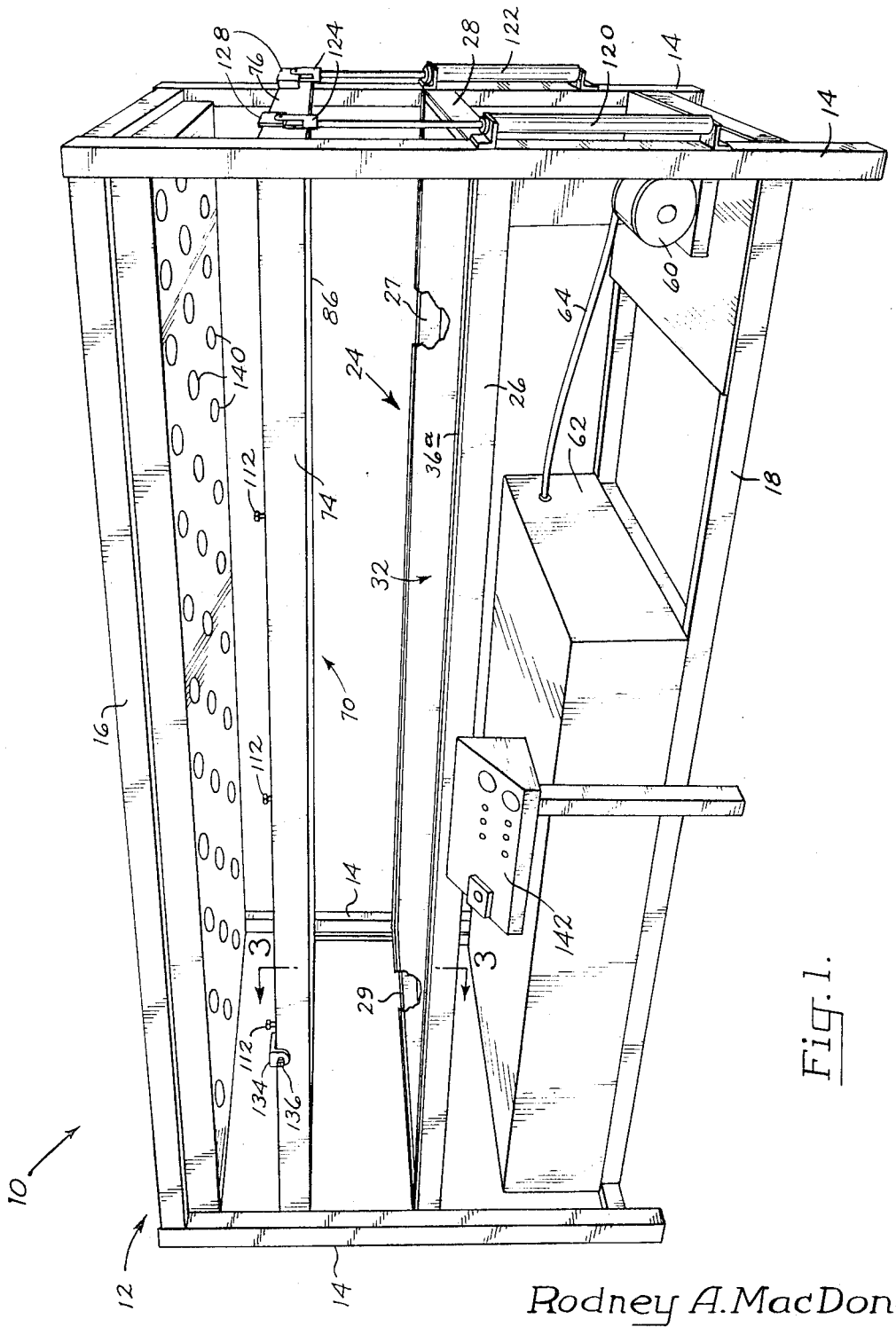

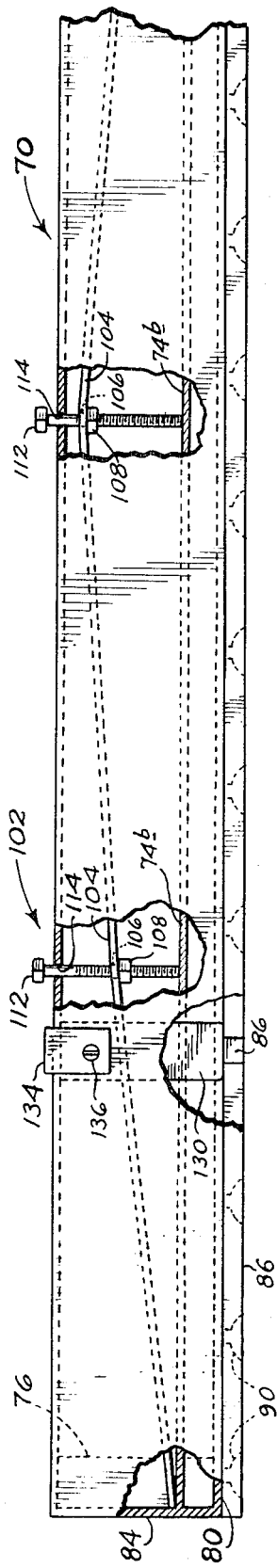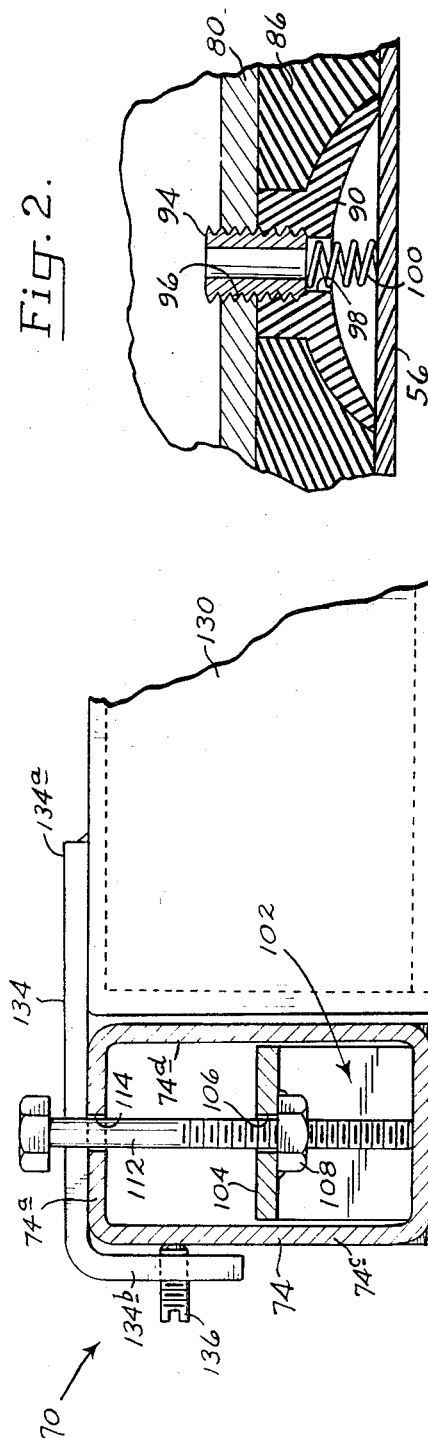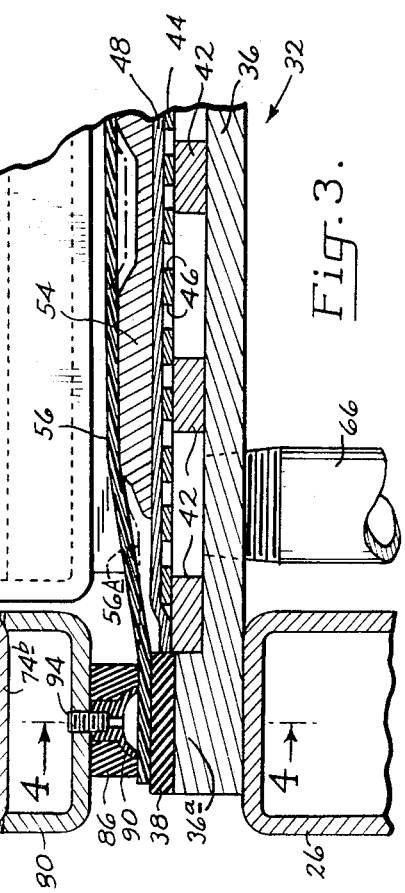

SHEET FORMING APPARATUS

This invention relates to apparatus for forming sheet material.

In forming sheet material, such as vinyl plastic sheets, it is common to use vacuum-forming apparatus in which a mold is placed on a table, a sheet to be formed is draped thereover, and the region between the table and sheet is evacuated to draw the sheet tightly over the mold. It is desirable to provide a tight seal between the table and the sheet around the edges of the mold. When forming heavy thermoplastic sheets it might be necessary also to heat the sheet to make it more pliable before it is drawn over the mold.

A general object of the invention is to provide novel sheet-forming apparatus having a raisable and lowerable clamping frame for clamping the edges of a sheet against a mold table, and means on the clamping frame for raising and lowering a sheet therewith.

Another object is to provide such a novel clamping frame which is movable toward and away from the mold table, wherein the means for causing a sheet to raise and lower therewith includes vacuum grab means operable selectively either to retain a sheet adjacent the clamping frame as it is moved relative to the mold table or to allow such sheet to remain resting on the table. One embodiment of sheet-forming apparatus according to the invention includes a heat source spaced from the mold table, toward which heat source the clamping frame may be moved. The vacuum grab means permits the clamping frame to carry a sheet to be formed, to a region adjacent the heat source where the sheet may be heated to make it more pliable, and thus more easily formed.

Another object of the invention is to provide, for sheet-forming apparatus including a mold table, a novel clamping frame for clamping the edges of a sheet against the mold table. The clamping frame includes an elongated hollow beam which may be moved against the mold table to clamp the edges of the sheet, and the beam includes internal truss structure which inhibits deflection of the beam. This permits a uniform tight seal to be produced between the sheet and the table.

Still another object is to provide such a beam in the clamping frame wherein the internal truss structure is adjustable permitting adjustment of the forces which resist beam deflection.

These and other objects and advantages will become more fully apparent as the following description is read in conjunction with the drawings, wherein:

FIG. 1 is a perspective view of sheet-forming apparatus constructed according to the invention;

FIG. 2 is an enlarged side view of a frame member in the apparatus, with portions broken away;

FIG. 3 is an enlarged cross-sectional view taken generally along the line 3—3 in FIG. 1, with parts in the apparatus shifted to positions other than those shown in FIG. 1; and FIG. 4 is an enlarged cross-sectional view taken generally along the line 4—4 in FIG. 3.

Referring now to the drawings, and first more specifically to FIG. 1, at 10 is indicated generally sheet-forming apparatus constructed according to the invention. The apparatus includes a support frame 12 having upright corner posts 14, an upper frame section 16 secured to the upper ends of the corner posts and extending substantially horizontally therebetween, and a lower frame section 18 secured to corner posts 14 adjacent their lower ends and extending substantially horizontally therebetween.

A mold table indicated generally at 24 is secured to posts 14 and extends horizontally therebetween, intermediate the upper and lower frame sections. The mold table includes a pair of laterally spaced, parallel, elongated side rails 26, 27, and a pair of elongated, parallel, spaced-apart end rails 28, 29. The side rails and end rails are secured to the corner posts of the support frame to form a rectangular frame upon which a mold bed, indicated generally at 32, rests.

Referring specifically to FIG. 3, which illustrates a portion of the mold bed in cross section, it will be seen that the mold bed includes a substantially rigid deck plate 36. The deck plate is mounted on side rails 26, 27 and end rails 28, 29. A lip 36a, projects upwardly above the top surface of the major portion of deck plate 36 and extends continuously around the outer margin of the deck plate. A flat rubber pad, or gasket, 38 is secured to the top of lip 36a and extends fully around the outer margin of deck plate 36.

The deck plate further includes a series of elongated, laterally spaced-apart ribs 42 which are secured to the top of deck plate 36 and extend lengthwise of the bed. A perforated plate 44, having a plurality of holes 46 extending therethrough is mounted on ribs 42 and above deck plate 36. A fabric cover 48 through which air may pass, in this case canvas, is stretched tightly over plate 44 and is secured around its edges to ribs 42 adjacent lip 36a.

Mold bed 32 is adapted to support a mold, such as a carved wooden panel, a part of which is illustrated in cross section at 54 in FIG. 3. A sheet to be formed over the mold, such as a sheet of air-proof vinyl plastic material 56, rests on mold 54 with the edges of the sheet extending beyond the edges of the mold and resting on pad 38.

Referring now to FIG. 1, mounted on lower frame section 18 is a motor-driven vacuum pump 60 and a vacuum tank 62 which are interconnected by a conduit 64. Pump 60 is operable to maintain a lower-than-atmospheric pressure within tank 62.

As is seen in FIG. 3, one end of a conduit 66 is connected through deck plate 36 to the space between a pair of ribs 42 on the deck. The opposite end of conduit 66 connects with tank 62, whereby the region between sheet 56 and the deck plate may be evacuated to produce a lower-then-atmospheric pressure therebetween. Lowering the pressure between the sheet and deck plate causes the sheet to be drawn down tightly over mold 54 whereby the sheet assumes the shape of the carvings in the mold, which shape is indicated generally by the dot-dashed outline at 56A.

Referring again to FIG. 1, a clamping frame, indicated generally at 70, is mounted above mold table 24 for vertical movement in the support frame relative to the mold table. Clamping frame 70 includes a pair of elongated, laterally spaced, parallel side beams such as that indicated at 74 (the other side beam being spaced to the rear of beam 74 and obscured in FIG. 1). The clamping frame also includes a pair of elongated, parallel end beams, such as that indicated generally at 76 at the right side of FIG. 1 (the other end beam being obscured at the left end of the apparatus in FIG. 1). The end beams interconnect opposite sets of ends of the side beams to form a substantially rectangular frame.

The end beams and side beams of the clamping frame are substantially similar in construction. Each beam, and referring specifically to beam 74 illustrated in cross section in FIG. 3, is hollow, having what may be referred to as top and bottom plates 74a, 74b, respectively and opposed side plates 74c, 74d. An elongated channel 80 extends along the underside of the beam with its web spaced below plate 74b and its flanges secured, as by air-tight continuous welds, to the underside of the beam. End plates, such as that illustrated at 84 in FIG. 2 close off opposite ends of beam 74 and channel 80. Channel 80 and bottom plate 74b together provide what is referred to herein as a vacuum manifold. The vacuum manifold is connected through appropriate conduit means (not shown) to vacuum tank 62, whereby a lower-than-atmospheric pressure may be produced within the manifold.

Secured to the underside of channel 80 is an elongated resilient rubber pad, or gasket, 86 which extends continuously along the length of the beam. A series of resilient suction cups, 90 are imbedded in pad 86 at spaced intervals therealong. The suction cups face downwardly and away from the beam with their lower edges coinciding with the underside of pad 86 (see FIGS. 3 and 4).

Each of suction cups 90 communicates with the interior of the vacuum manifold through a cylindrical threaded fitting 94 screwed into a threaded bore 96 in channel 80 and an opening 98 in the suction cup communicating with the interior of fitting 94. A small compression spring 100 is secured in opening 98 and extends downwardly therefrom. This spring's purpose will be explained more fully below.

Mounted internally of each side beam is truss structure as indicated generally at 102 in FIGS. 2 and 3. The truss structure includes an elongated strap 104, also referred to herein as a tension member, which is secured, as by welding, at its ends to the ends of bottom plate 74c of the beam. At spaced intervals along the strap bores 106 extend therethrough. A nut 108 is secured to the underside of the strap adjacent each bore and receives a bolt 112 therethrough. The lower end of each bolt contacts bottom plate 74b. The upper end of each bolt extends through a bore 114 in upper plate 74a of the beam and thus is accessible for adjustment. Selective adjustment of bolts 112 is effective to bias bottom plate 74b and strap 104 away from each other. Bolts 112 and nuts 108 are referred to herein also as adjustable screw devices. These screw devices act in conjunction with the strap to brace bottom plate 74b against deflection upwardly intermediate its ends.

Referring again to FIG. 1, clamping frame 70 is supported in frame 12 by hydraulic rams, such as those indicated at 120, 122 at the right end of the frame in FIG. 1, secured to each corner post of the support frame. Each ram is secured at its cylinder end to its associated corner post with its rod end projecting upwardly. A clevis and pin combination 124 connects each ram to an angle member 128 secured to the clamping frame. Suitable pressure fluid supply means and control means are provided for the rams, whereby the rams may be extended or contracted simultaneously to raise or lower the clamping frame.

The clamping frame is illustrated in FIG. 1 in what may be considered an open, or raised, position, spaced above mold table 32. On contraction of the rams, the clamping frame is lowered toward the mold table to a closed, or clamping, position as illustrated in FIG. 3. In this closed position, the undersides of pads 86 on the frame members contact the upper surface of the edge margins of sheet 56 and clamp them tightly against pad 38 on the mold table. A substantially air-tight seal thus is provided about the edges of the region between sheet 56 and the mold table, permitting evacuation of this region.

Truss structure 102 within the side beams of the clamping frame prevents the side beams from being deflected upwardly intermediate their ends by the clamping force exerted thereagainst. A tight seal thus is provided along the entire length of the beam.

A cross beam 130, one end of which is seen in FIG. 3, extends between the side beams. Cross beam 130 is constructed substantially similar to the side beams and end beams and has similar vacuum manifold, resilient pad and suction cups extending along its underside. The cross beam is mounted on the side beams for sliding movement longitudinally of the side beams by angle brackets at its opposite ends, such as the bracket indicated at 134 in FIG. 3. A horizontal let 134a of the bracket is secured, as by welding, to the top of cross beam 130 and extends outwardly therefrom to rest on a side beam. The depending leg 134b of the bracket extends downwardly adjacent the outer side of the side beam. A screw, 136, extending through a threaded bore in leg 134a, may be screwed against the side beam to hold the cross beam in place. Suitable conduit means may be connected to the vacuum manifold of cross beam 130 to accommodate producing a lower-than-atmospheric pressure therein.

Mounted in upper frame section 16 of the support frame are multiple banks of heat lamps 140 which are positioned to direct heat downwardly toward the mold table.

A control panel 142 is positioned forwardly of the support frame in FIG. 1. The control panel includes controls which are suitably connected to operating mechanism in the apparatus for controlling operation of the apparatus.

Explaining now the operation of the sheet-forming apparatus of the invention, to form a vinyl plastic sheet over a mold, such as carved panel 54, the mold is laid on mold table 32 with its carved side facing up. Often the mold may not extend the full length of the mold table. In such case, the mold is positioned adjacent the right end of the apparatus and cross beam 130 is positioned along the side beams of the clamping frame a short distance to the left of the left end of the mold on the table.

A sheet of vinyl plastic to be formed is placed over the mold with edge margins of the sheet resting on pads 38 around the edges of the mold table. In the case where the mold is shorter than the mold table, it is not necessary to extend the plastic sheet the full length of the table, and it may stop somewhat short of the left end of the apparatus in FIG. 1. The portion of the top of the mold table not overlain by the plastic sheet may be covered with a plastic or rubber blanket to seal off such remaining portion.

The clamping frame is lowered to its closed, or clamping, position and pads 86 on the side beams and end beams clamp the edge margins of the plastic sheet tightly against pads 38. In those instances where the plastic sheet does not extend fully to the left end of the apparatus, the pad extending along the bottom of cross beam 130 passes the left end margin of the plastic sheet against the upper surface of the mold bed.

Should it be desired to provide an adhesive bond between the vinyl sheet and the mold, the sheet may be raised with the clamping frame above the mold and its underside then may be coated with an adhesive. Explaining further, and with the clamping frame in its closed position, lowering the pressure within vacuum manifold 80 below atmospheric pressure produces a lowered pressure in suction cups 90 which holds the edge margins of sheet 56 against the underside of pads 86. Spring 100 in each of the suction cups prevents marginal portions of the sheet from being drawn upwardly into bore 98 in the suction cup. With the edge margins of the sheet held against the underside of pads 86 and the pad extending along cross beam 130, the clamping frame may be raised, and the sheet will raise with it. The underside of the sheet then may be coated with an adhesive.

Certain heavy sheets of plastic must be heated to make them sufficiently pliable to be formed properly in such apparatus. With the clamping frame raised to its open position shown in FIG. 1, a sheet held against the underside of the clamping frame is in a position to be heated by heat lamps 140. After the sheet has been either coated on its underside with an adhesive or heated by lamps 140, or both, as desired, it is lowered to the mold table. The region between the sheet and deck plate 36 of the mold bed then is evacuated to draw the sheet down tightly over mold 54 whereby it conforms to the shape of the mold as indicated by dot-dashed outline at 56A. If an adhesive coating has been applied between the sheet and the mold, the two are bonded together.

After the sheet has been drawn down over the mold, the pressure within manifold 80 is increased whereby suction cups 90 release the edge margins of the sheet, and the clamping frame is raised to its open position. The pressure between deck plate 36 and the sheet then is raised permitting the mold and the overlying sheet to be removed from the apparatus.

While an embodiment of the invention has been described herein, it should be obvious to those skilled in the art that variations and modifications are possible without departing from the spirit of the invention.

It is claimed and desired to secure by Letters Patent:

1. Apparatus for forming sheet material comprising
a mold table for supporting the mold and an overlay sheet
a clamping frame above said mold table including an elongated hollow beam disposed substantially parallel to the top of said table and truss means mounted within said beam operable to inhibit deflection of said beam intermediate its ends upwardly and away from said table,
means mounting said table and frame for movement relative to each other between a clamping position in which the clamping frame is adjacent the table to clamp such sheet against the table and an open position in which the table and frame are spaced vertically from each other,
power-operated means operable to produce such relative movement, and vacuum grab means on said clamping frame operable to retain such sheet adjacent such frame when the table and frame are moved apart.

2. The apparatus of claim 1, wherein said beam comprises an elongated bottom plate, and said truss means comprises an elongated tension member above said plate secured at its ends at spaced points to said bottom plate, and bracing means interposed between said bottom plate and tension member operable to bias intermediate portions of said plate and tension member away from each other.

3. The apparatus of claim 2, wherein said bracing means is adjustable for varying the force with which the bottom plate and tension member are biased away from each other.

4. The apparatus of claim 3, wherein said bracing means comprises a screw device including an adjustment portion accessible from the outside of said beam.

5. The apparatus of claim 1, wherein said vacuum grab means comprises means secured to said beam and extending therealong defining a vacuum manifold within which a lower-than-atmospheric pressure may be produced, and suction openings extend through the bottom of said manifold.

6. The apparatus of claim 5, wherein said means defining the vacuum manifold includes a rigid, elongated side portion extending along one side of the beam, said suction openings extend through said side portion of the manifold, and an elongated resilient pad is secured to the outer surface of said side portion, said pad having openings extending therethrough communicating with the suction openings in the manifold.

7. The apparatus of claim 6, which further comprises suction cups on said pad communicating with said openings in the pad and facing outwardly and away from said manifold.

8. The apparatus of claim 7, which further comprises means disposed within a suction cup for inhibiting deflection of a sheet into said cup.

9. Apparatus for forming sheet material comprising
a substantially horizontal mold table for supporting a mold and an overlay sheet,
a substantially horizontal clamping frame above said mold table
means mounting said frame for vertical movement relative to the table between a clamping position in which the clamping frame is adjacent the table to clamp a sheet against the table and an open position in which the frame is spaced vertically upwardly from the table, said frame being maintained substantially horizontal throughout such movement,
power-operated means operable to produce such relative movement,
vacuum grab means on said clamping frame permitting the frame to fasten to a sheet with the sheet having been disposed on said table and with the frame then adjusted to a clamping position, and operable to retain such a sheet adjacent said frame when the table and frame are moved apart with such sheet maintained substantially horizontal, and
heating means disposed above said frame with the frame in its said open position for heating a sheet retained thereby.

* * * * *